United States Patent
Pavlov

(10) Patent No.: US 7,653,651 B1
(45) Date of Patent: Jan. 26, 2010

(54) SYSTEM AND METHOD FOR TRANSPARENT PERSISTENCE MANAGEMENT

(75) Inventor: Vladimir K. Pavlov, Sofia (BG)

(73) Assignee: SAP AG, Walldorf (DE)

( * ) Notice: Subject to any disclaimer, the term of this patent is extended or adjusted under 35 U.S.C. 154(b) by 428 days.

(21) Appl. No.: 10/836,159

(22) Filed: Apr. 29, 2004

(51) Int. Cl.
G06F 17/30 (2006.01)

(52) U.S. Cl. ............................. 707/103 R; 707/103 Y

(58) Field of Classification Search ................. 714/13; 707/102, 100, 200, 104.1, 103 R, 103 Y
See application file for complete search history.

(56) References Cited

U.S. PATENT DOCUMENTS

| | | | |
|---|---|---|---|
| 4,841,434 | A | 6/1989 | Mathewes, Jr. et al. |
| 5,499,371 | A | 3/1996 | Henninger et al. |
| 5,878,407 | A | 3/1999 | Olgac |
| 6,182,086 | B1 | 1/2001 | Lomet et al. |
| 6,360,223 | B1 | 3/2002 | Ng et al. |
| 6,453,325 | B1 | 9/2002 | Cabrera et al. |
| 6,714,943 | B1 | 3/2004 | Ganesh et al. |
| 6,728,719 | B1 | 4/2004 | Ganesh et al. |
| 6,912,569 | B1 * | 6/2005 | Sharma et al. ............. 709/223 |
| 6,980,988 | B1 | 12/2005 | Demers et al. |
| 2002/0035673 | A1 | 3/2002 | Roseborough et al. |
| 2002/0040409 | A1 * | 4/2002 | Matena et al. ............. 709/315 |
| 2002/0049603 | A1 * | 4/2002 | Mehra et al. ................... 705/1 |
| 2002/0069157 | A1 | 6/2002 | Jordan |
| 2002/0152422 | A1 * | 10/2002 | Sharma et al. ............... 714/13 |
| 2003/0058277 | A1 | 3/2003 | Bowman-Amuah |
| 2003/0120659 | A1 | 6/2003 | Sridhar |
| 2003/0140308 | A1 | 7/2003 | Murthy et al. |
| 2003/0163479 | A1 * | 8/2003 | Mathews et al. ............ 707/102 |
| 2003/0172091 | A1 | 9/2003 | Norcott |
| 2003/0177477 | A1 | 9/2003 | Fuchs |
| 2003/0182461 | A1 | 9/2003 | Stelting et al. |
| 2004/0133487 | A1 | 7/2004 | Hanagan et al. |
| 2004/0172385 | A1 | 9/2004 | Dayal |
| 2005/0033730 | A1 | 2/2005 | Chaudhuri et al. |

(Continued)

OTHER PUBLICATIONS

Cecchet, et al., "Performance and scalability of EJB applications", Proceedings of the 17th ACM conference on Object-oriented programming, systems, languages, and applications, Nov. 2002, P-246-261. Retrieved from the Internet: <URL:http://portal.acm.org/ft_gateway.cfm?id=582443&type=pdf&coll=ACM&dl=ACM&CFID=53140692&CFTOKEN=91313057>.*

(Continued)

*Primary Examiner*—John E Breene
*Assistant Examiner*—Dennis Myint

(57) ABSTRACT

One embodiment of the invention employs "transparent object persistence" techniques in which persistent data objects (i.e., the objects that represent persistent data from a database) are separated from business processing objects (i.e., the objects that handle the requests, process specific business operations, manipulate the persistent data and respond to clients). Within a Java 2 Enterprise Edition ("J2EE") environment, the business processing objects are entity beans managed by an Enterprise Java Bean ("EJB") container. A persistence manager manages the persistent data objects, which provide an in-memory representation of a set of database data. The entity beans manipulate the persistent data by invoking get/set accessor methods on the persistent data objects. In one embodiment, the persistence manager associates a state with each of the persistent data objects which indicates an operation to be performed within tables of a relational database when the modifications to the persistent data objects are committed to the relational database.

19 Claims, 14 Drawing Sheets

U.S. PATENT DOCUMENTS

| | | | |
|---|---|---|---|
| 2005/0050068 | A1 | 3/2005 | Vaschillo et al. |
| 2005/0097187 | A1 | 5/2005 | Thompson et al. |
| 2005/0203920 | A1 | 9/2005 | Deng et al. |
| 2005/0240556 | A1 | 10/2005 | Larson et al. |
| 2005/0240577 | A1 | 10/2005 | Larson et al. |

OTHER PUBLICATIONS

Ran et al., "The rigorous evaluation of Enterprise Java Bean technology", Proceedings. 15th International Conference on Information Networking, Feb. 2001, P-93-100. Retrieved from the Internet< URL: http://ieeexplore.ieee.org/iel5/7259/19584/00905336.pdf?tp=&arnumber=905336&isnumber=19584>.* http://jaffa.sourceforge.net/documentation/persistence/engines.html, 4 pages.

"Constructor (computer science)", http://en.wikipedia.org/wiki/Constructor_%28computer_science%29, 4 pages.

http://dev.mysql.com/doc/refman/4.1/en/char.html, 4 pages.

"BEA WebLogic Server and WebLogic Express 8.1 Documentation", http://e-docs.bea.com/wls/docs81/index.html, 3 pages.

"Interface Blob", http://java.sun.com/j2se/1.3/docs/api/java/sql/Blob.html, 4 pages.

"java.lang.String", http://www.cafeaulait.org/course/week4/53.html, Mar. 8, 2003, 2 pages.

"Oracle Technology Network", http://www.oracle.com/techology/index.html, 2 pages.

"SAMS Teach Yourself EJB in 21 Days", *Ragae Ghaly and Krishna Kothapalli*, 2003, pp. 353-376.

"SAP & TomorrowNow Support", http://www.java2s.com/Code/Java/Database-SQL-JDBC/Createtabledatatype.htm, Copyright Apr. 2003 Demo Source and Support., 7 pages.

Huber, Bernhard, http://cocoon.apache.org/2.0/userdocs/readers/database-reader.html, 3 pages.

"The Char and Varchar Types", http://dev.mysgl.com/doc/refman/4.1/en/char.html, 4.

http://jaffa.sourceforge.net/documentation/persistence/engines.html, Last Modified: Thur Jun. 26, 2003 at 6:05:27pm.

"Application Server Articles", *Barry & Associates, "Application Server Articles"* 2 pages, http://www.service-architecture.com/application-servers/index.html Printed on Jul. 22, 2004, 2.

"Demo Source and Support", http://java2s.com/Code/Java/Database-SQL-JDBC/Cratetabledatatype.htm, (2003), 7.

"Object Database Articles", *Barry & Associates, "Object Database Articles"* 2 pages, http://www.service-architecture.com/object-oriented-databases/articles/index.html Printed on Jul. 22, 2004, 2.

"Object-Relational Mapping Articles and Products", *Barry & Associates, "Object-Relational Mapping Articles and Products"* 2 pages, http://www.service-architecture.com/object-relational-mapping/index.html Printed Aug. 24, 2004, 2.

"Online Articles", *Barry & Associates, "Online articles"* 2 pages, http://www.service-architecture.com/articles/index.html Printed on Jul. 22, 2004, 2.

"Oracle Application Server 10g (9.0.4) Documentation", *Oracle Technology Network, "Oracle Application Server 10g (9.0.4) Documentation"* 2 pages, http://otn.oracle.com/documentation/appserver10g.html Printed on Jul. 22, 2004, 2.

"Oracle9i Application Server Release 2 Documentation", *Oracle Technology Network "Oracle9i Application Server Release 2 Documentation"* 1 page, http://otn.oracle.com/documentation/ias.html Printed on Jul. 22, 2004, 1.

"Programming WebLogic Enterprise JavaBeans", http://edocs.bea.com/wls/docs70/html, WebLogic Server 7.0 In disclosure of Dec. 29, 2003, (Jul. 22, 2004), 1-33.

"Relational Database Articles", *Barry & Associates, "Relational Database Articles"* 2 pages, http://www.service-architecture.com/relational-databases/articles/index.html Printed on Jul. 22, 2004, 2.

"Web Services Articles", *Barry & Associates, "Web Services Articles"* 3 pages, http://www.service-architecture.com/web-services/articles/index.html Printed on Jul. 22, 2004, 3.

"XML Database Articles", *Barry & Associates, "XML Database Articles"* 2 pages, http://www.service-architecture.com/xml-databases/articles/index.html Printed on Jul. 22, 2004, 2.

"XML Middleware Articles", *Barry & Associates, "XML Middleware Articles"* 2 pages http://www.service-architecture.com/xml-middleware/articles/index.html Printed on Jul. 22, 2004, 2.

D., Barry, "Web Services and Service-Oriented Architectures", *Barry, D., "Web Services and Service-Oriented Architectures"* 4 pages, http://service-architecture.com/index.html Printed on Jul. 22, 2004, 4.

Barry and Associates, "Reprint Policy", Barry & Associates, "Reprint Policy" 2 pages, http://www.service-architecture.com/reprint_policy.html, Last accessed on Jun. 12, 2008.

* cited by examiner

| Start State | CREATE | REMOVE | UPDATE |
|---|---|---|---|
| DEFAULT | CREATED | REMOVED | UPDATED |
| UPDATED | Duplicate Key | REMOVED | UPDATED |
| CREATED | Duplicate Key | VIRTUALLY REMOVED | CREATED |
| REMOVED | UPDATED | No Such Entity | No Such Entity |
| VIRTUALLY REMOVED | CREATED | No Such Entity | No Such Entity |

*Fig. 5*

Persistence Management State Transitions

*Depth-First Search*

SYSTEM AND METHOD FOR TRANSPARENT PERSISTENCE MANAGEMENT

BACKGROUND

1. Field of the Invention

This invention relates generally to the field of data processing systems. More particularly, the invention relates to a system and method for transparently managing persistence in an object-oriented environment.

2. Description of the Related Art

Multi-Tier Enterprise Computing Systems

Java 2 Enterprise Edition ("J2EE") is a specification for building and deploying distributed enterprise applications. Unlike traditional client-server systems, J2EE is based on a multi-tiered architecture in which server side program code is divided into several layers including a "presentation" layer and a "business logic" layer.

FIG. 1 illustrates an exemplary J2EE application server 100 in which the presentation layer is implemented as a Web container 111 and the business layer is implemented as an Enterprise JavaBeans ("EJB") container 101. Containers are runtime environments which provide standard common services 119, 109 to runtime components. For example, the Java Naming and Directory Interface ("JNDI") is a service that provides application components with methods for performing standard naming and directory services. Containers also provide unified access to enterprise information systems 117 such as relational databases through the Java Database Connectivity ("JDBC") service, and legacy computer systems through the J2EE Connector Architecture ("JCA") service. In addition, containers provide a declarative mechanism for configuring application components at deployment time through the use of deployment descriptors (described in greater detail below).

As illustrated in FIG. 1, each layer of the J2EE architecture includes multiple containers. The Web container 111, for example, is itself comprised of a servlet container 115 for processing servlets and a Java Server Pages ("JSP") container 116 for processing Java server pages. The EJB container 101 includes three different containers for supporting three different types of enterprise Java beans: a session bean container 105 for session beans, an entity bean container 106 for entity beans, and a message driven bean container 107 for message driven beans. A more detailed description of J2EE containers and J2EE services can be found in RAGAE GHALY AND KRISHNA KOTHAPALLI, SAMS TEACH YOURSELF EJB IN 21 DAYS (2003) (see, e.g., pages 353-376).

Persistence and Enterprise Java Beans

The information systems of a modern day enterprise (such as a corporation or government institution) are often responsible for managing and performing automated tasks upon large amounts of data. Persistent data is that data that "exists" for extended periods of time (i.e., it "persists"). Persistent data is typically stored in a database so that it can be accessed as needed over the course of its existence. Here, complex "database software" (e.g., such as DB2, Oracle, and SQL Server) is often used to read the data and perhaps perform various intelligent functions with it. Frequently, persistent data can change over the course of its existence (e.g., by executing a series of reads and writes to the data over the course of its existence). Moreover, multiple items of different persistent data may change as part of a single large scale "distributed transaction."

FIG. 2 illustrates the manner in which persistent data is managed in current J2EE environments. Session beans 255-257 comprise the high level workflow and business rules implemented by the application server 100. For example, in a customer relationship management ("CRM") system, session beans define the business operations to be performed on the underlying customer data (e.g., calculate average customer invoice dollars, plot the number of customers over a given timeframe, . . . etc).

Session beans typically execute a single task for a single client during a "session." Two versions of session beans exist: "stateless" session beans and "stateful" session beans. As its name suggests, a stateless session bean interacts with a client without storing the current state of its interaction with the client. By contrast, a stateful session bean stores its state across multiple client interactions.

Entity beans are persistent objects which represent data (e.g., customers, products, orders, . . . etc) stored within a database 223. Typically, an entity bean 252 is mapped to a table 260 in the relational database and, as indicated in FIG. 2, each "instance" of the entity bean is typically mapped to a row in the table (referred to generally as an "object-relational mapping"). Two different types of persistence may be defined for entity beans: "bean-managed persistence" and "container-managed persistence." With bean-managed persistence, the entity bean designer must provide the code to access the underlying database (e.g., SQL Java and/or JDBC commands). By contrast, with container-managed persistence, the EJB container 101 manages the underlying calls to the database.

EJB Interfaces and Methods

Each EJB consists of "remote home" and/or "local home" interface and "remote component" and/or "local component" interface, and one class, the "bean" class. The home interface lists the methods available for creating, removing and finding EJBs within the EJB container. The home object is the implementation of the home interface and is generated by the EJB container at deploy time. The home object is used by clients to identify particular components and establish a connection to the components' interfaces. The component interfaces provides the underlying business methods offered by the EJB.

One particular type of method provided by the home interface is a "finder" method, which allows clients to locate particular entity beans and associated data. In response to a client request, for example, finder methods may execute a database query and return a set of entity beans representing the results of the query. In a large enterprise environment, thousands or even millions of entities may be selected from the database in response to the query, and a separate bean object may be created for each of them. Once a group of entity bean objects representing database data are generated in memory, the entity beans may be modified via data transactions (described below), resulting in changes to the underlying database at commit time (i.e., when the modifications are committed to the database).

SUMMARY

One embodiment of the invention employs "transparent object persistence" techniques in which persistent data objects (i.e., the objects that represent persistent data from a database) are separated from business processing objects (i.e., the objects that handle the requests, process specific business operations, manipulate the persistent data and respond to clients). Within a Java 2 Enterprise Edition ("J2EE") environment, the business processing objects are entity beans managed by an Enterprise Java Bean ("EJB") container. A persistence manager manages the persistent data objects, which provide an in-memory representation of a set of database data. The entity beans manipulate the persistent data by invoking get/set accessor methods on the persistent data objects. In one embodiment, the persistence manager associates a state with each of the persistent data objects which indicates an operation to be performed within tables of a relational database when the modifications to the persistent data objects are committed to the relational database.

BRIEF DESCRIPTION OF THE DRAWINGS

A better understanding of the present invention can be obtained from the following detailed description in conjunction with the following drawings, in which:

FIG. 5 illustrates a state transition table employed by one embodiment of the persistent management layer.

DETAILED DESCRIPTION OF PREFERRED EMBODIMENTS

Described below is a system and method for managing persistent object-oriented data within an enterprise network. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Note that in this detailed description, references to "one embodiment" or "an embodiment" mean that the feature being referred to is included in at least one embodiment of the invention. Moreover, separate references to "one embodiment" in this description do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

An Exemplary Application Server Architecture

Figure 1:
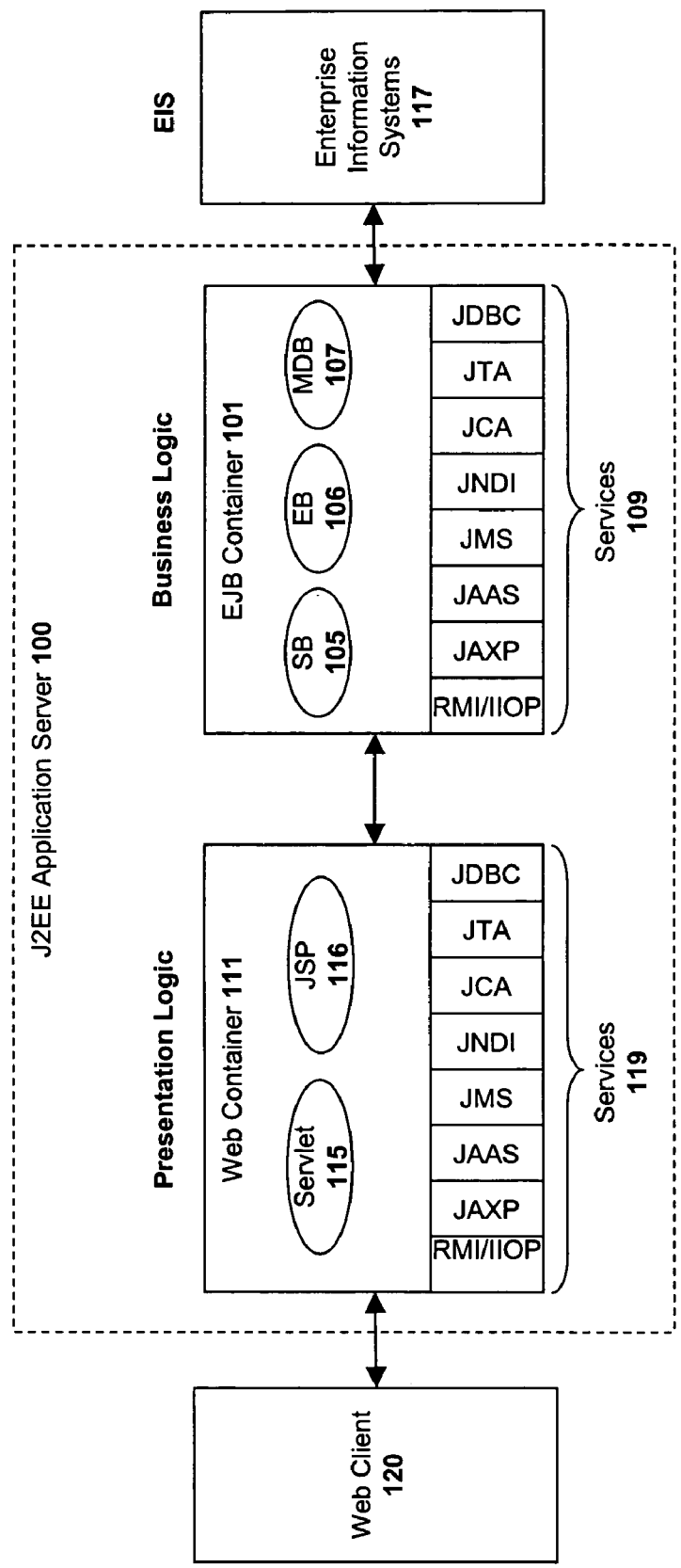
FIG. 1 illustrates several layers within a prior art J2EE architecture.
Figure 2:
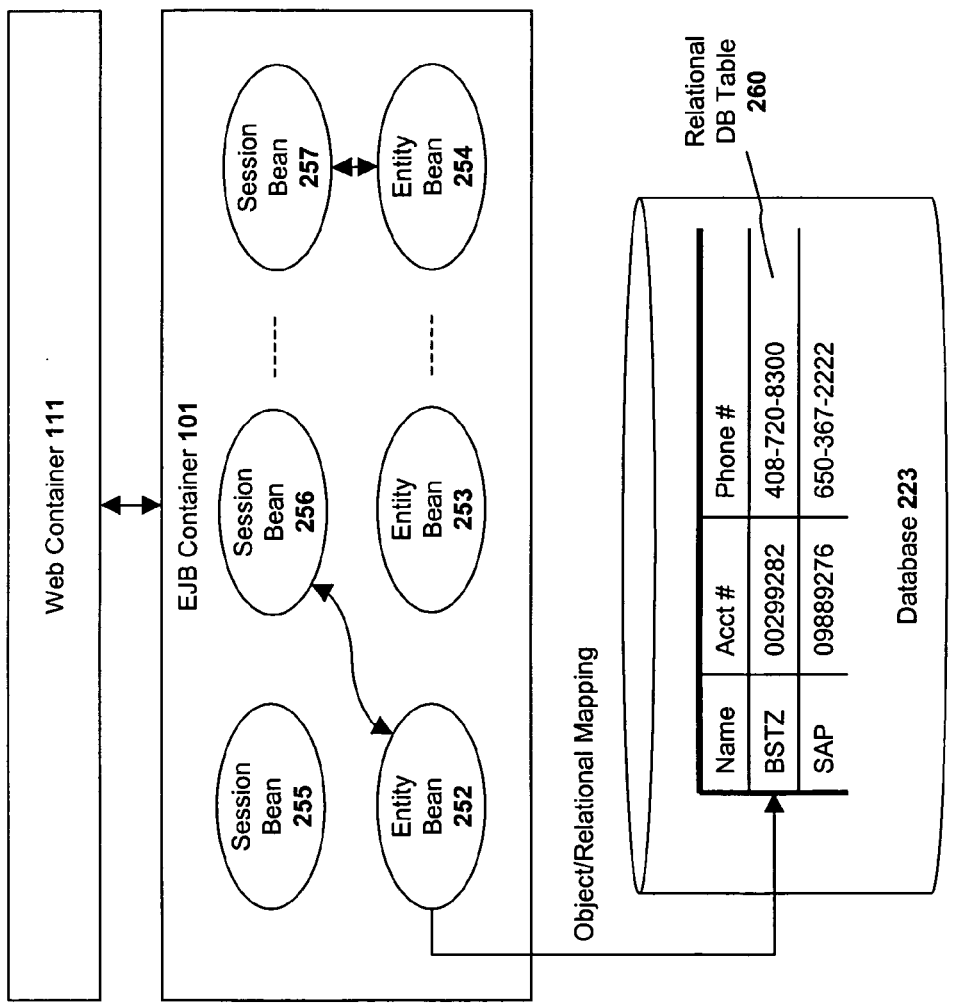
FIG. 2 illustrates a prior art object/relational mapping between an entity bean and a relational database table.
Figure 3:
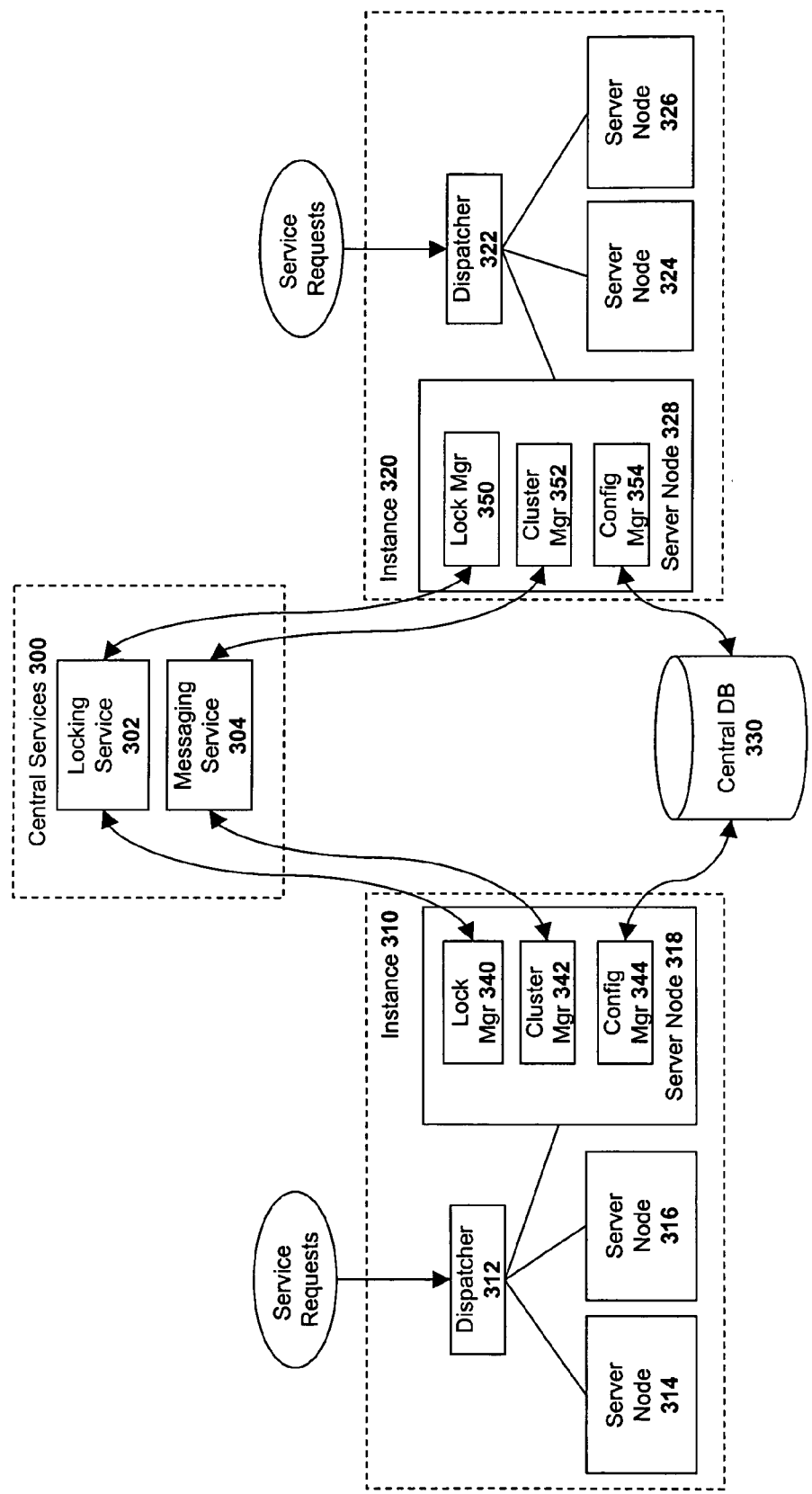
FIG. 3 illustrates a clustered server architecture on which embodiments of the invention are implemented.

A system architecture according to one embodiment of the invention is illustrated in FIG. 3. The architecture includes a central services instance 300 and a plurality of application server instances 310, 320. As used herein, the application server instances, 310 and 320, each include a group of server nodes 314, 316, 318 and 324, 326, 328, respectively, and a dispatcher 312, 222, respectively. The central services instance 300 includes a locking service 302 and a messaging service 304. The combination of all of the application instances 310, 320 and the central services instance 300 is referred to herein as a "cluster." Although the following description will focus solely on instance 310 for the purpose of explanation, the same principles apply to other instances such as instance 320.

The server nodes 314, 316, 318 within instance 310 are used to implement business logic and presentation logic. Each of the server nodes 314, 316, 318 within a particular instance 310 may be configured with a redundant set of application logic and associated data. In one embodiment, the dispatcher 312 distributes service requests from clients to one or more of the server nodes 314, 316, 318 based on the load on each of the servers. For example, in one embodiment, the dispatcher 312 implements a round-robin policy of distributing service requests.

In the description that follows, the server nodes 314, 316, 318 are Java 2 Enterprise Edition ("J2EE") server nodes which support Enterprise Java Bean ("EJB") components and EJB containers (at the business layer) and Servlets and Java Server Pages ("JSP") (at the presentation layer). Of course, the embodiments of the invention described herein may be implemented in the context of various different software platforms including, by way of example, Microsoft .NET platforms and/or the Advanced Business Application Programming ("ABAP") platforms developed by SAP AG, the assignee of the present application.

In one embodiment, communication and synchronization between each of the instances 310, 320 is enabled via the central services instance 300. As illustrated in FIG. 3, the central services instance 300 includes a messaging service 304 and a locking service 302. The message service 304 allows each of the servers within each of the instances to communicate and stay synchronized with one another via a message passing protocol. For example, messages from one server may be broadcast to all other servers within the cluster via the messaging service 304. Alternatively, messages may be addressed directly to specific servers within the cluster (i.e., rather than being broadcast to all servers). The term "messages" is used broadly here to refer to any type of data communication between the server nodes and dispatchers in the cluster.

In one embodiment, the locking service 302 disables access to (i.e., locks) certain specified portions of data and/or program code stored within a central database 330. Moreover, the locking service 302 enables a distributed caching architecture in which copies of data are cached locally at servers/dispatchers.

In one embodiment, the messaging service 304 and the locking service 302 are each implemented on dedicated servers. However, the messaging service 304 and the locking service 302 may be implemented on a single server or across multiple servers while still complying with the underlying principles of the invention.

As illustrated in FIG. 3, each server node (e.g., 318, 328) includes a lock manager 340, 350 for communicating with the locking service 302; a cluster manager 342, 352 for communicating with the messaging service 304; and a configuration manager 344, 354 for communicating with a central database 330 (e.g., to store/retrieve data as described herein). Although the lock manager 340, 350, cluster manager 342, 352 and configuration manager 344, 354 are illustrated only with respect to server nodes 318 and 328 in FIG. 3, each of the server nodes 314, 316, 324 and 326 and/or on the dispatchers 312, 322 may be equipped with equivalent lock managers, cluster managers and configuration managers.

Embodiments of a Persistence Management Layer

Figure 4:
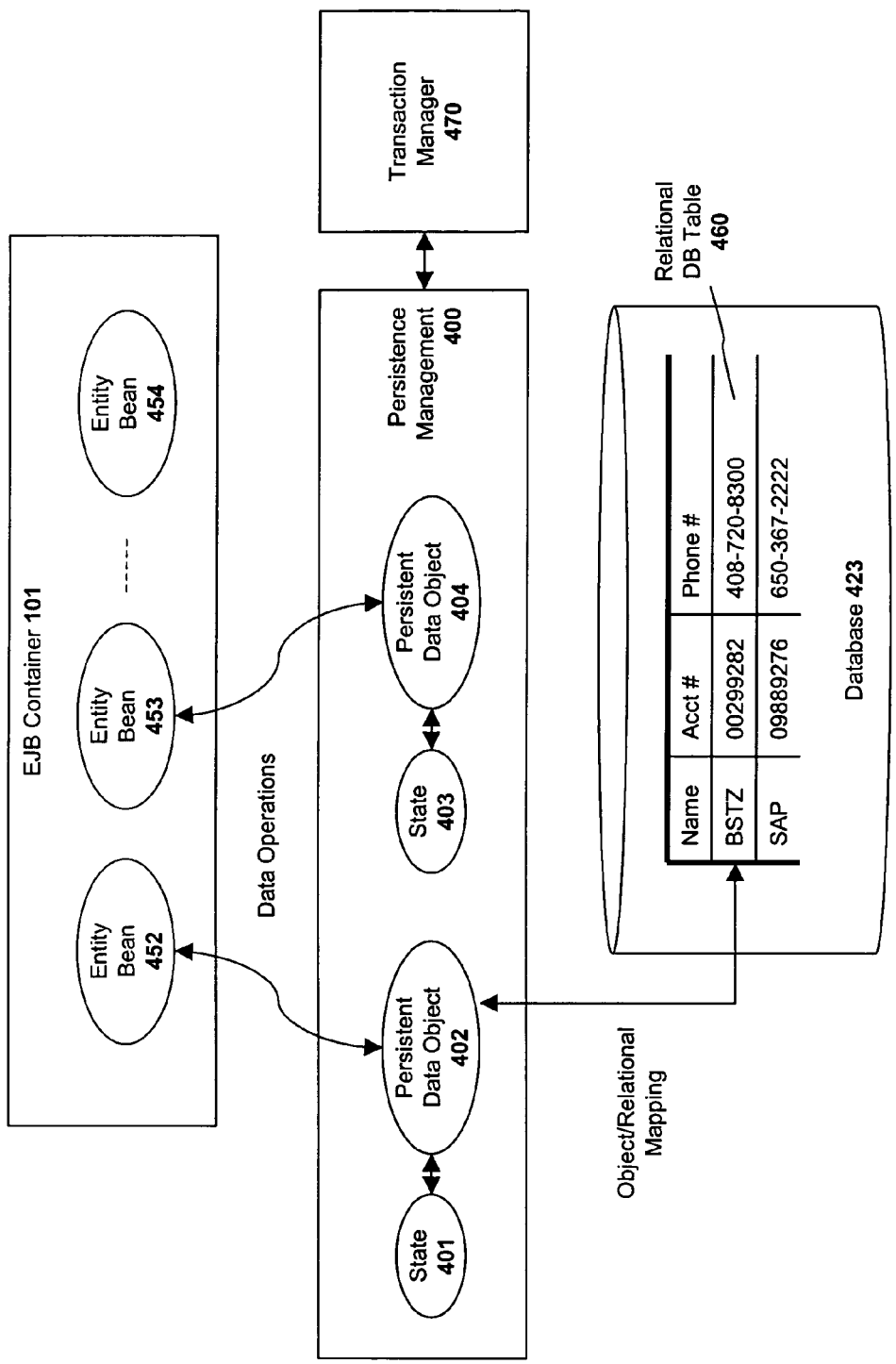
FIG. 4 illustrates one embodiment of a system comprising a persistent management layer for managing persistent data.

The embodiments of the invention described herein improve the portability and extensibility of enterprise applications by separating the pure business logic (e.g., entity beans and session beans in a J2EE environment) from persistent data objects. FIG. 4 illustrates one embodiment which includes a persistence manager 400 for managing a plurality of persistent data objects 402, 404. The persistent data objects 402, 404 provide an in-memory representation of persistent data stored within a database 423. For example, in one embodiment, each persistent data object 402, 404 contains data from a row in a database table 460.

In a J2EE environment, the EJB containers 101 on the various server nodes 314, 316, 318, 324, 326, 328, interact with the persistence manager 400 through a well-defined interface. In one embodiment, for every container-managed entity bean instance 452-453 activated by the EJB Container 101 in response to a client request, a corresponding persistent data object 402, 404 is created by the persistence manager 400. Unlike a standard J2EE configuration in which each of the entity bean instances contains persistent data from the database, the entity bean instances 452-453 illustrated in FIG. 4 are comprised of only the business methods that manipulate the persistent data (e.g., using abstract get/set methods), and the persistent data itself is stored and managed by the persistence manager 400. In one embodiment, these methods are provided as part of the EJB Container 101.

A persistence manager 400 and associated persistent data objects 402, 404 may be maintained as in an in-memory cache on each server node. While in memory, the data within the persistent data objects 402, 404 may be continually modified in response to business transactions. At some point, however, the persistent data must be committed to the database. As such, in one embodiment of the invention, the persistence manager 400 employs techniques to ensure that the correct database operations are performed when it is time to commit the data to the database. Specifically, in one embodiment, the persistence manager 400 associates a state property 401, 403 with each persistent data object 402, 404, respectively. The state property 401, 403 identifies the database operation to be executed when the data contained within the persistent data object 402, 404 is committed to the database (e.g., via an insert, update, or delete operation)

In one embodiment, the persistence manager 400 manages the state properties 401, 403 associated with each persistent data object 402, 404 according to the state transition table illustrated in FIG. 5. The state of a persistent object implies the operation that must be executed in order to synchronize its data with the database. The initial state of the persistent data object is set forth in column 501; the operations to be performed on the persistent data object are set forth in the top row of columns 502, 503 and 504; and the resulting state of the persistent data objects following each of the operations is set forth in the remaining rows of columns 502, 503 and 504. In one embodiment, the possible values for a persistent object state are as follows:

DEFAULT—The default property is the initial property of the persistent data object. All persistent data objects are in this state before they are affected by a transaction. If this state is preserved until the end of the transaction, this means that the data represented by the object is consistent, that this data is the same as in the database, and no operation is performed in the database.

UPDATED—The "updated" state indicates that the persistent data object has been changed. As such, the data within the database represented by the persistent data object must be synchronized with an "Update" query.

CREATED—The "create" state identifies a newly-created persistent data object. As such, the database must be synchronized with a "Create" query (e.g., a new row will be added to the database).

REMOVED—The "remove" state indicates that the persistent data object has been deleted. As such, the database must be synchronized with a "Remove" query (e.g., removing a row in the database).

VIRTUALLY REMOVED—The "virtually removed" state means the object is first created and then removed by the same transaction. As the "create" operation is performed only within the persistence manager 400 (i.e., within the cache of the server node) and not in the database, at the end of the transaction no operation will be executed to the database. Thus, after the transaction commits, the entity will not exist in the database. The difference from the "default" state is that for the active transaction, the persistent object is removed, and for all other transactions it never existed.

The table in FIG. 5 shows how the persistent object state is changed when a certain operation is performed on the persistent data object. For example, if the persistent data object is in the "default" state, then in response to a create, remove or update operation, the persistent data object will transition to the "created," "removed," or "updated" state respectively. If the persistent data object is in the "updated" or "created" state, then a "create" operation will result in an exception. The "duplicate key" entry indicates that a create operation would result in a duplicate primary key in the database (i.e., thereby rendering the database inconsistent). As is known in the art, a primary key is an attribute or a set of attributes that are unique among the rows of a database table. The table's primary key is used to refer to the rows of the table.

If a persistent data object is in the "created" state and a "remove" operation is performed on the persistent data object, then, as indicated in the table in FIG. 5, the persistent data object will transition to the "virtually removed" state. As mentioned above, when in the "virtually removed" (as opposed to the removed state), no database operation is required at commit time. In addition, when in the virtually removed state, if the persistent data object is once again created, it will transition to the "created" state. For obvious reasons, when in the "virtually removed" state or the "removed" state, there is no possibility of performing a "remove" operation or an "update" operation on the persistent data object.

It should be noted, that the state transition table shown in FIG. 5 is for the purpose of explanation only. Various other/additional state transitions may be implemented while still complying with the underlying principles of the invention.

One advantage of logically separating persistent data objects and pure business processing objects is that it simplifies the application development process (i.e., EJB application developers do not need to worry about database coding or data coherency issues), improves application portability and independence from the underlying physical data storage mechanism, and allows for lightweight, low-cost extensibility of applications. Developers who implement the processing objects (e.g., EJBs) work transparently with the persistent data objects.

At any given time, the same data from the database may be represented by multiple persistent data objects stored in-memory on (potentially) multiple server nodes. Given that the persistent data objects may be independently modified on each server node, one embodiment of the persistence manager 400 employs distributed data processing techniques to ensure the integrity of the in-memory representations of the data prior to each database commit. In one embodiment, a transaction manager 470 (shown in FIG. 4) is used to monitor distributed data transactions spread across multiple server nodes and/or databases. In one embodiment, the transaction manager evaluates the states of each of the persistent data objects to determine whether the transaction should be rolled back or committed to the database. If the same data is concurrently modified on two separate server nodes, for example, the transaction manager 470 may either roll back the transactions and put the data back in the state it was in prior to the transactions, or attempt to resolve the transactions and allow the data to be committed to the database (i.e., allow both transactions to occur as long as the transactions do not conflict with each other). Examples of transaction managers include, but are not limited to, the Java Transaction API ("JTA") that is part of the J2EE platform and the Microsoft Distributed Transaction Coordinator ("MDTC") from Microsoft Corporation.

Techniques for Efficient Data Loading and Processing

As mentioned above, in a large enterprise environment, a significant number of persistent data objects may be created as the result of each database query. Creating a new collection of persistent data objects for each query and sending them to the requesting client may result in a significant load on system and network resources. Moreover, when a database query is executed, the size of the returned collection of persistent data objects is difficult to predict.

Figure 6A:
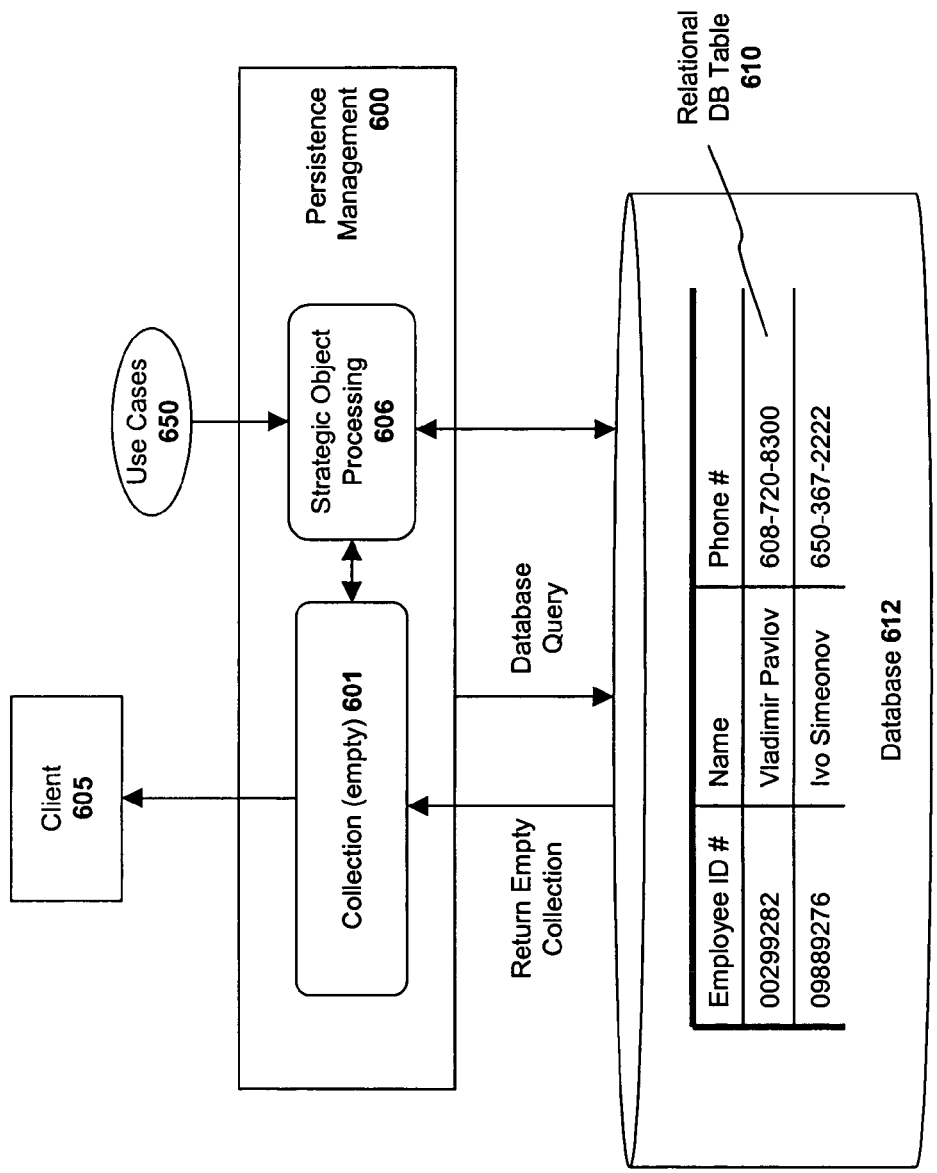
FIGS. 6a-c illustrate "lazy object creation" techniques employed in one embodiment of the invention.

One embodiment of the invention employs techniques for managing persistent data objects more efficiently and intelligently than prior systems, thereby improving response time and reducing server load and network traffic. Specifically, referring to FIGS. 6a-c, one embodiment of the invention includes strategic object processing logic 606 for generating selected bean objects on demand and/or in portions. As illustrated in FIG. 6a, in response to an initial client 605 request, an empty collection of data objects 601 is initially returned to the client 605 (i.e., a "collection" which contains none of the underlying data resulting from the database query). The term "client" is used broadly herein to refer to any entity which interacts with a database 423 via the persistence management layer 400. This may include, by way of example, servlets, JSPs or remote application clients.

Figure 6B:
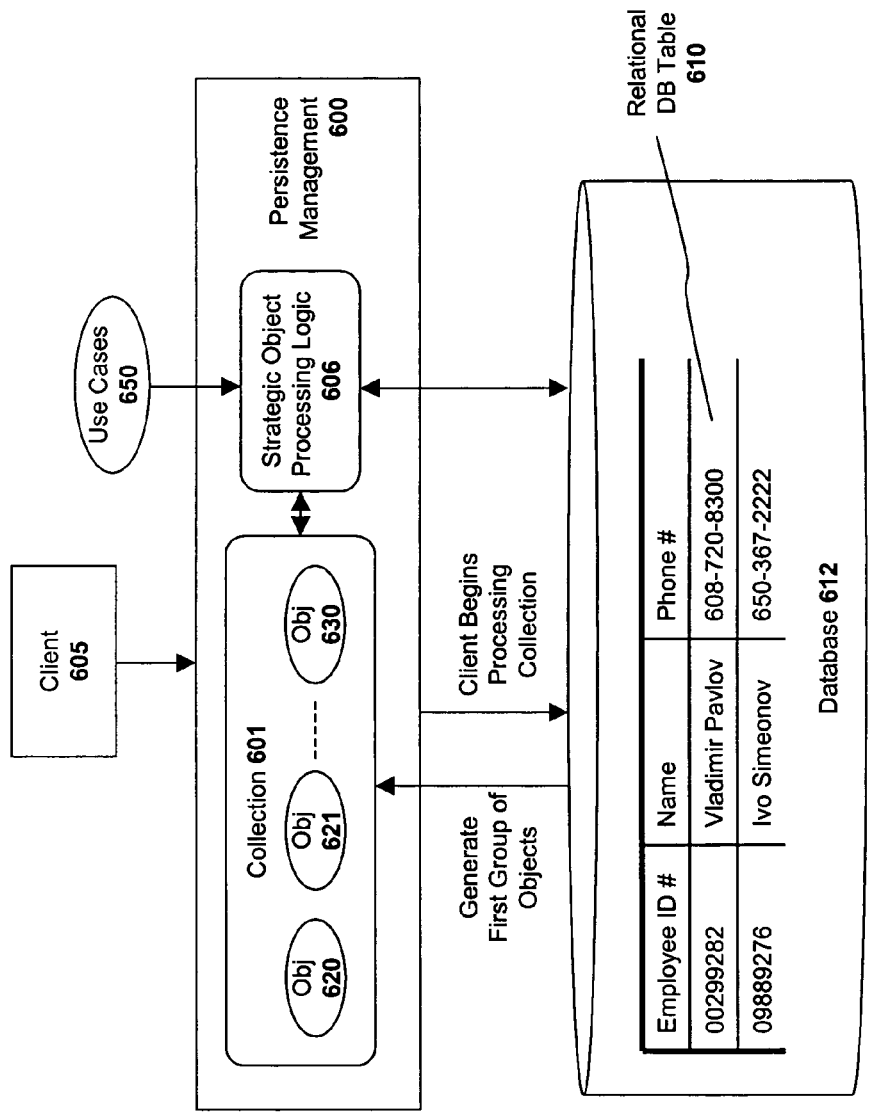
Figure 6C:
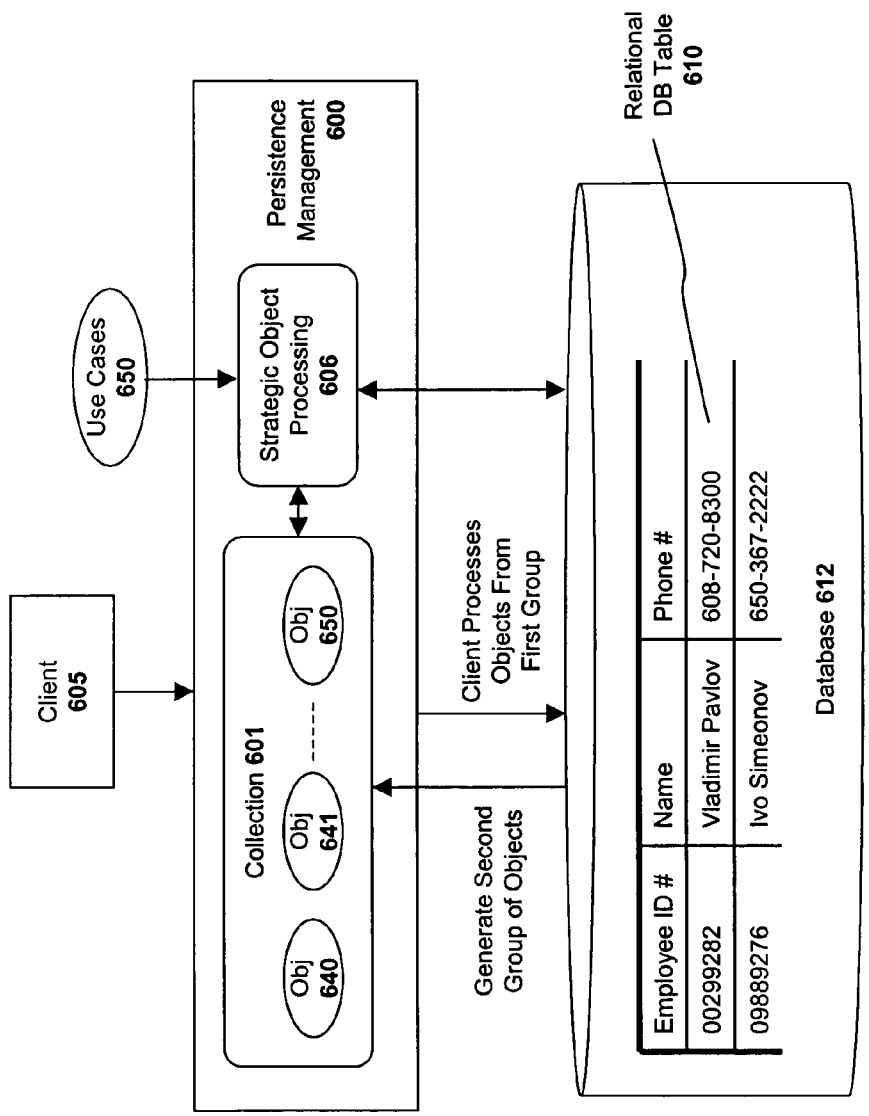

As illustrated in FIG. 6b, when the client 605 starts processing the collection (e.g., enumerating or changing the collection), the strategic object processing logic 606 generates a first portion of persistent data objects 620, 621, 630 resulting from the query, which are then provided to the client 605. After the client 605 processes one or more of the first portion of persistent data objects 620, 621, 630 and requires access to another object, the strategic object processing logic 606 generates a second group of persistent data objects 640, 641, 650, as illustrated in FIG. 6c. Generating and transferring persistent data objects in portions, only after the client 605 requires them, significantly improves the efficiency with which finder or select methods are executed. That is, it prevents unnecessary transferring of objects, which will not be used, thus reducing the load on the server and network traffic. In one embodiment, the particular size of the first and/or second specified group of objects is configurable by the developer and/or end user (e.g., the size may be dynamically modifiable based on defined "use cases" as described below). The strategy of generating objects in portions rather than all at once is referred to herein as "lazy object creation."

Each row of each table 610 within the relational database 612 is identified by its "primary key." Any convenient type of number may be used as the primary key. For example, in FIGS. 6a-c, the primary key may be each employee's ID number. In an environment such as J2EE where each persistent data object is uniquely mapped to a row in a database table 610, a special persistent field within the persistence management layer 400 is used to store the primary key (i.e., to uniquely identify each persistent data object).

Figure 7A:
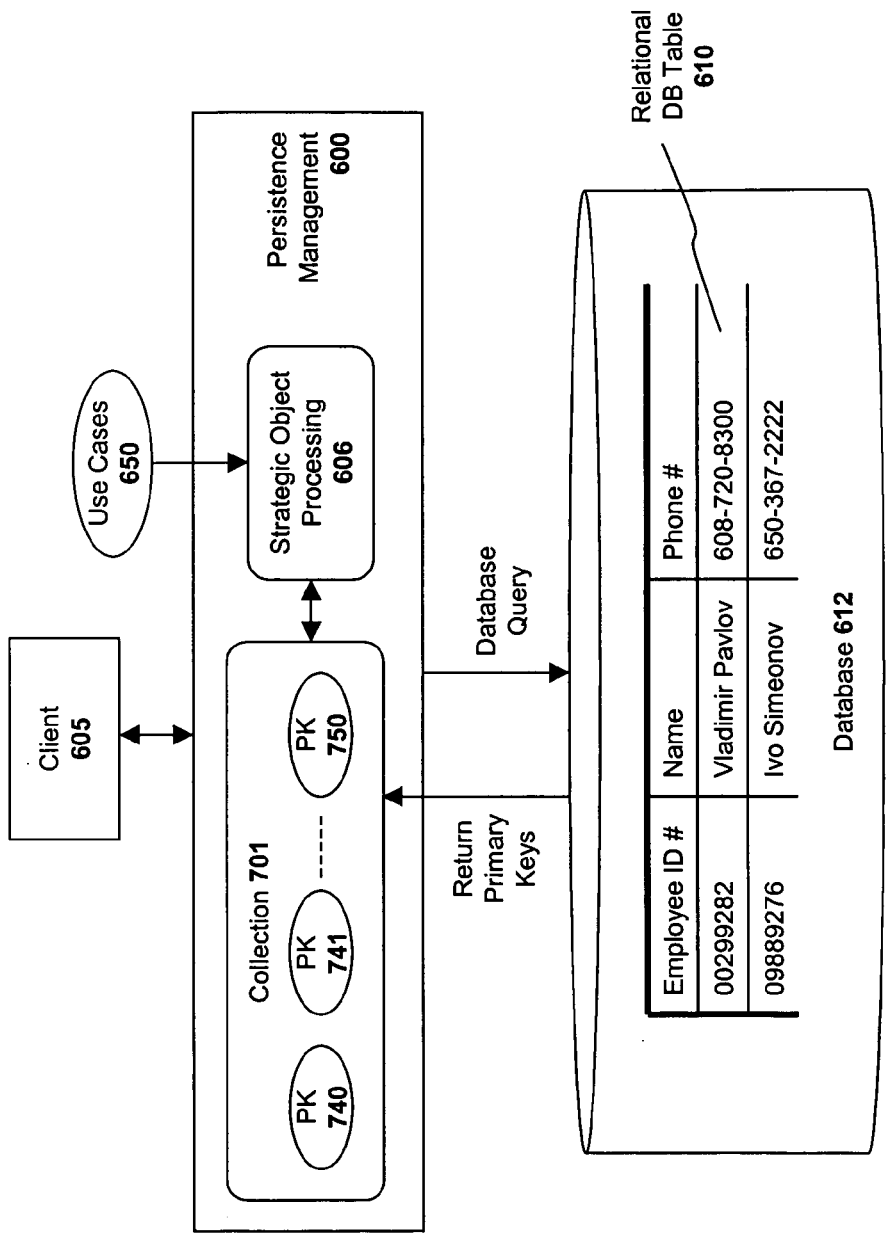
FIGS. 7a-b illustrate "loading on demand" techniques employed in one embodiment of the invention.
Figure 7B:
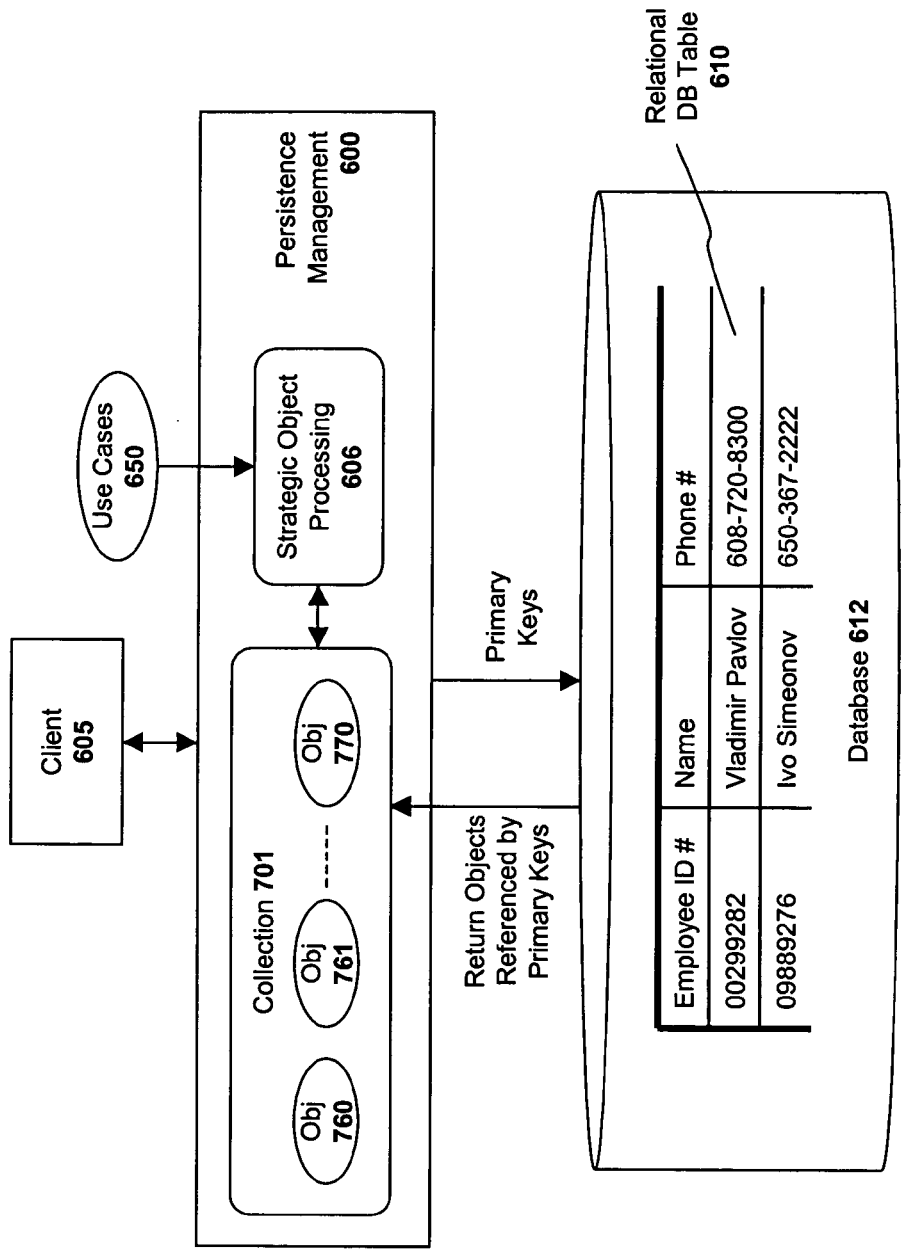

Referring one embodiment of the invention illustrated in FIG. 7a, in order to further improve efficiency, the strategic object processing logic 606 initially generates only the primary keys 740, 741, 750 of the data objects resulting from the initial database query (i.e., rather than the actual data objects). If the client processes the collection 701 and requires the data identified by the primary keys then, as illustrated in FIG. 7b, the strategic object processing logic 606 generates the persistent data objects 760, 761, 770 identified by each primary key 740, 741, 750, respectively. If the client (or other owner of the collection) does not require the data identified by the primary keys 740, 741, 750, then the data objects 760, 761, 770 are never generated, resulting in reduced network and server load. The foregoing strategy for creating data objects is referred to herein as "loading on demand."

In some circumstances, it may be desirable to automatically generate the persistent data objects 760, 761, 770 in response to a client request for performance reasons. For example, if a relatively small amount of data will result from the database query, it may be more efficient to automatically generate the data objects 760, 761, 770, rather than generating primary keys and waiting for a secondary request. Accordingly, in one embodiment of the invention, if the database query results in a number of persistent data objects below a specified threshold value, then the strategic object processing logic 606 generates the persistent data objects 760, 761, 770 in response to the query. This strategy is referred to herein as "optimistic-loading." By contrast, if the database query will result in a number of persistent data objects above a specified threshold value, then the strategic object processing logic 606 employs the "loading on demand" strategy described above (i.e., it generates the primary keys 740, 741, 750 initially; and generates the persistent data objects 760, 761, 770 only when needed by the client).

In one embodiment of the invention, the strategic object processing logic 606 performs one or more of the foregoing techniques based on the conditions surrounding the database query and/or the configuration of the strategic object processing logic 606. For example, the techniques of lazy object creation and optimistic loading may be combined so that the strategic object processing logic 606 initially generates a first portion of objects containing only primary keys. The strategic object processing logic 606 may then generate a first portion of persistent data objects identified by the first portion of primary keys when the client 605 requires access to the underlying data. After the client processes one or more of the first portion of persistent data objects, the strategic object processing logic 606 may generate a second portion of objects containing only primary keys (and so on). Combining the two techniques in this manner reduces the possibility that a persistent data object will be generated unnecessarily, thereby further reducing network and server load.

As indicated in FIGS. 6a-c and FIGS. 7a-b, the strategic object processing logic 606 may be programmed with "use cases" defining common database queries and the circumstances under which each of the object creation techniques described above are to be employed. For example, a very common use case which typically results in a relatively small set of data objects is a search for an employee by his/her last name. Similarly, a query for a particular order may result in a relatively small number of line items associated with the order. Accordingly, for these types of use cases, the strategic object processing logic 606 may employ the "optimistic-loading" strategy, automatically generating all persistent data objects, rather than generating only primary keys and/or loading the data objects in portions.

By contrast, other common queries may result in a significant number of persistent data objects. For example, a query identifying all of the employees within a company or department may result in hundreds or thousands of persistent data objects, potentially only one of which is sought by the end user. Similarly, a query for all orders placed between a particular date range may result in a significant number of persistent data objects. Thus, for these types of use cases, the strategic object processing logic 606 may perform the loading on demand and/or the lazy object creation strategies (i.e., loading the data objects in portions and/or initially providing only primary keys to the requesting client).

It should be noted that specific examples set forth above are for the purpose of illustration only. The strategic object processing logic 606 may be programmed with a virtually unlimited number of different use cases while still complying with the underlying principles of the invention.

System and Method for Ordering a Database Flush Sequence at Transaction Commit As mentioned above, an EJB container keeps track of all changes to persistent data made by each transaction and synchronizes the changes with the database at the end of the transaction. The EJB container maintains a list of persistent objects which are affected by a transaction. The list is typically ordered in the same sequence in which the entity beans are affected by the transaction. To prevent database integrity constraint exceptions, one embodiment of the invention reorders the sequence of operations represented by the transaction list prior to committing the operations identified in the transaction list to the database. For example, in one embodiment, relationships between entity beans/database tables are evaluated before the operations of the transaction are committed to the database.

Figure 8:
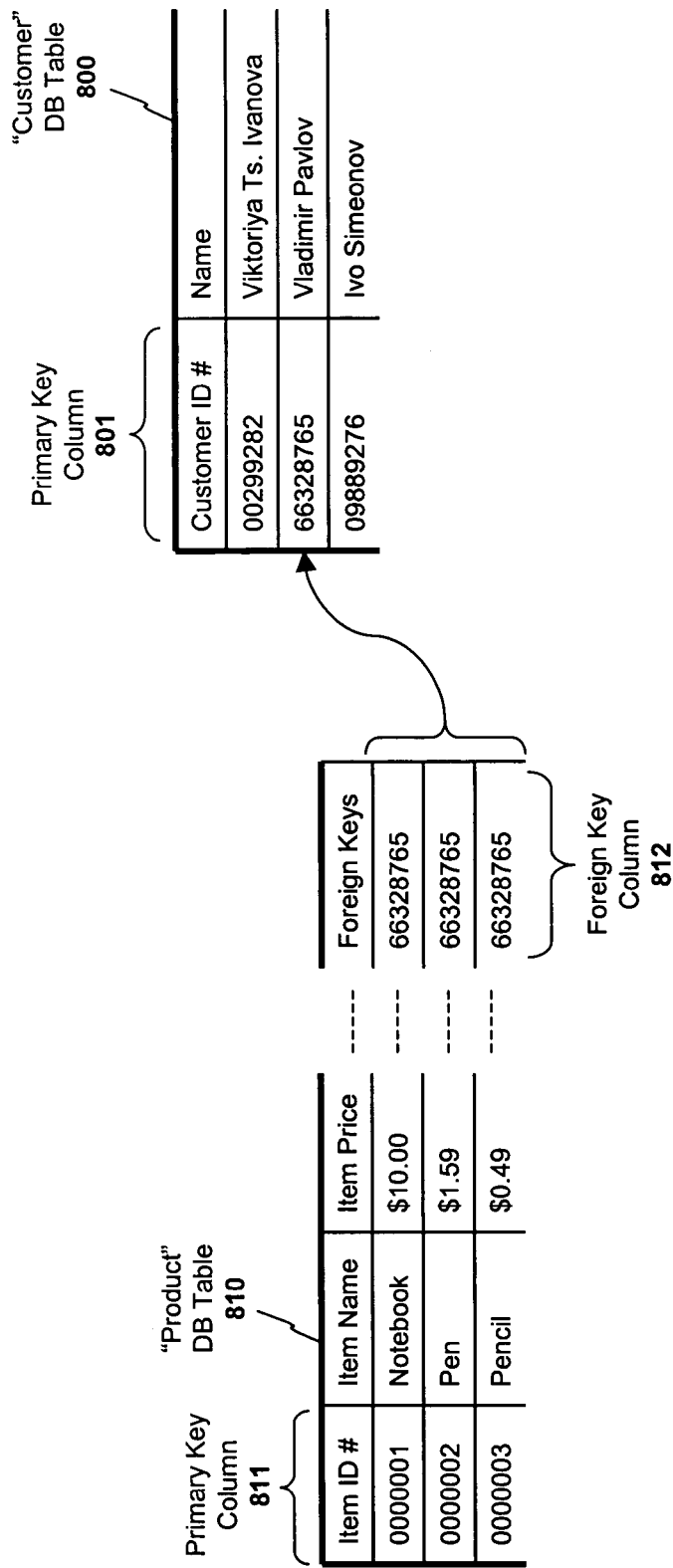
FIG. 8 illustrates a relationship between two tables in a relational database.

For the purpose of illustration, an exemplary relationship between a "customer" database table 800 and a "product" database table 810 is illustrated in FIG. 8. The customer database table 800 includes a plurality of rows which represent a different customers, and the product database table 810 includes a plurality of rows which represent different products. Each column stores different information on the customers or products represented by the tables (e.g., item ID, item name, item price, customer name, . . . etc).

One column in each table, referred to as a "primary key" column 801, 811 stores the primary key for each row. As mentioned above, the primary key is an identification code for uniquely identifying each row of each database table. For example, in the customer table 800, the primary key is the customer ID code (e.g., 00299282 for Viktoriya Ts. Ivanova), whereas in the product database table, the primary key is the product identification code (e.g., 0000001 for the notebook).

Within a relational database, relationships between tables are expressed using "foreign keys." For example, in FIG. 8, foreign key column 812 includes references to the primary key 66328765 of one of the customers in the customer table, indicating that the customer has purchased the three items from the product table. In an object oriented environment (e.g. such as the persistence management layer 600 described above), the relationship between the tables is expressed as a "relationship field" of a persistent data object (also referred to as a "container-managed relationship" or CMR field). In the foregoing example, The relationship between the customer table 800 and the product table 810 is one-to-many (i.e., a single customer has purchased multiple products). As such, each instance of the persistent data object representing the customer database table is associated with multiple instances of the persistent data object representing the products database table. Relationships between tables and persistent data object may also be one-to-one, in which each instance of a persistent data object is associated with a single instance of another persistent data object; and many-to-many, in which persistent data objects may be associated with multiple instances of each other.

Figure 9:
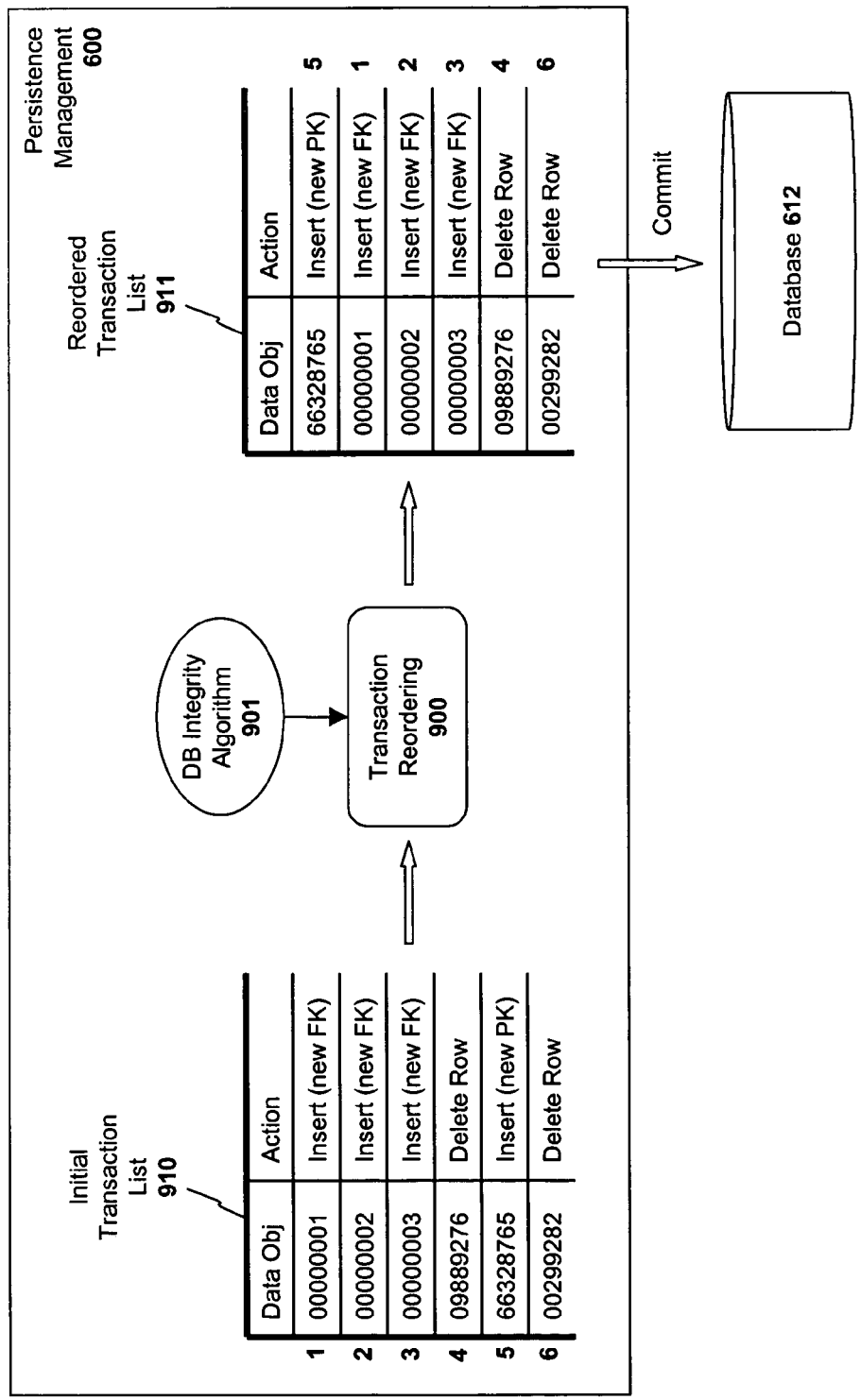
FIG. 9 illustrates transaction reordering logic employed in one embodiment of the invention to reorder a series of operations in a transaction.

Due to the relationships between the two database tables 800 and 810 and, thus, the persistent data object instances that represent the tables, one embodiment of the invention evaluates the operations to the persistent data objects resulting from each transaction prior to flushing the changes to the database. Specifically, as illustrated in FIG. 9, one embodiment of the invention includes transaction reordering logic 900 which evaluates the list of operations 910 performed on persistent data objects during the course of a transaction, and reorders the initial transaction list 910 if the initial order violates database integrity rules 901. The transaction is then committed to the database 612 using the reordered list of operations 911.

Figure 10:
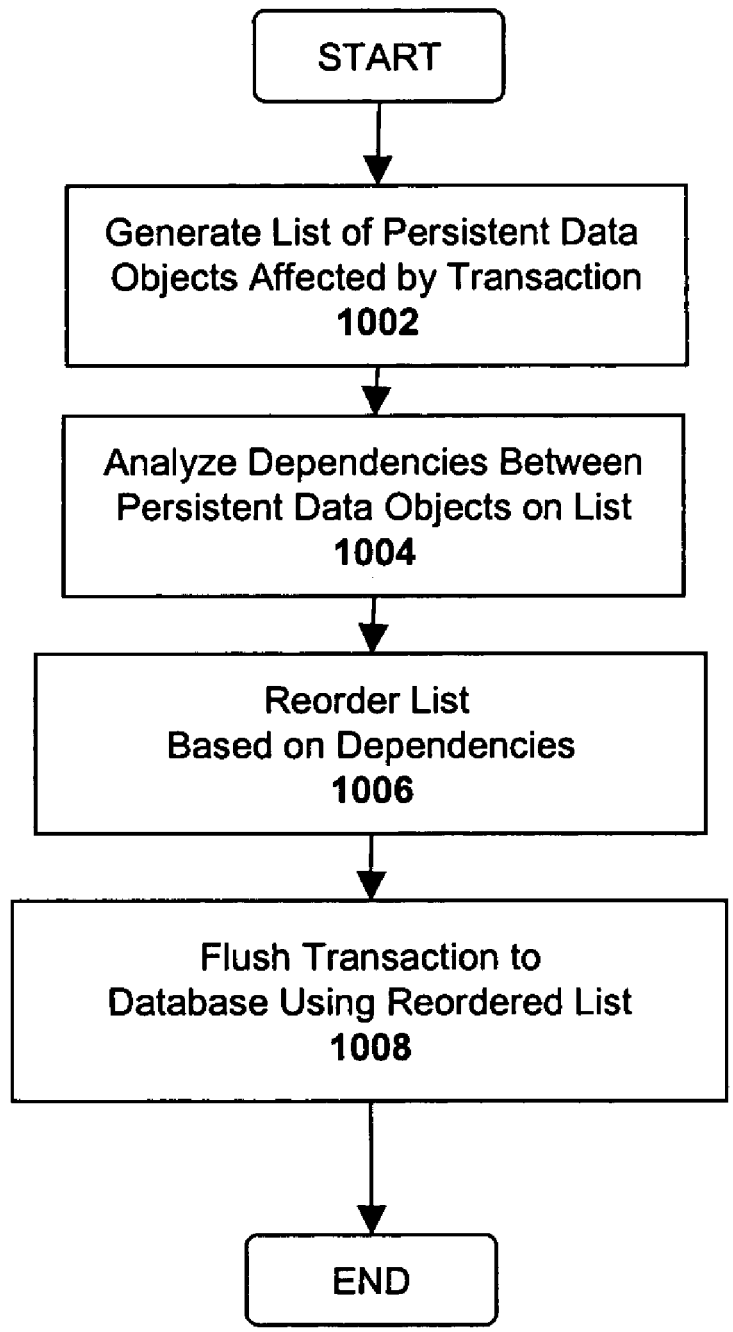
FIG. 10 illustrates a method implemented by the transaction reordering logic in one embodiment of the invention.

In one embodiment, the transaction reordering logic 900 operates according to the method illustrated in FIG. 10. At 1002, the persistence manager 600 (and/or the EJB container) monitors the operations involved in a particular transaction and generates a list 910 of each of the operations of the transaction. The list is ordered in the same sequence in which the affected persistent data objects are accessed during the transaction (represented as steps 1-6 from top to bottom in FIG. 9).

At 1004, the transaction reordering logic 900 analyzes the dependencies between each of the persistent data objects affected by each transaction and reorders the sequence with which the changes are flushed to the database. Specifically, in one embodiment, the transaction reordering logic 900 ensures that any persistent data objects which depend on other persistent data objects are flushed only after the persistent data objects on which they depend are flushed. By way of example, in the initial transaction list 910, operations 1, 2 and 3 insert new rows in the product database table 810 containing foreign keys identifying a customer from the customer database table 800 (i.e., using primary key 66328765 in the customer table as the foreign key). However, in the initial transaction list 910, the new customer row identified by primary key 66328765 is not inserted into the customer database table 800 until operation 5 is executed. Thus, executing the insert operations 1, 2, and 3 in the order illustrated in FIG. 9 would violate the database integrity rules 901 (i.e., because they refer to a primary key which does not yet exist).

Once the dependencies are evaluated, at 1006, the transaction reordering logic 900 reorders the series of operations so that operation 5, which creates the new customer/primary key, occurs before the inset operations 1, 2 and 3, which reference the primary key. The reordered transaction list 911 which complies with the database integrity rules 901 is illustrated in FIG. 9. At 1008, the operations of the transaction are flushed to the database in the new order.

In one particular embodiment, the transaction reordering logic 900 evaluates a special binary relation between any two persistent data objects, A and B, referred to as "relation dependency" in which persistent data object A "depends on" entity B only if they are in a relationship and one of the following is true:

(1) Persistent data object A has a foreign key to persistent data object B, and B is created in the transaction (i.e., B must be synchronized in the database with an insert statement).

(2) Persistent data object B has a foreign key to persistent data object A, and A is deleted in this transaction (i.e. A must be synchronized in the database with a delete statement).

This binary relation is reflexive, transitive, and antisymmetric. This means that it is a partial order. One well-known algorithm for sorting a partial order relation is the "topological sort" algorithm. To employ a topological sort algorithm to determine an appropriate flush sequence, the transaction reordering logic 900 evaluates the abstract persistent schema of the persistence manager as an oriented graph, whose vertexes are the persistent data objects and whose edges are the dependency relations between the persistent data objects.

In one particular embodiment, the transaction reordering logic 900 then implements the topological sort using a "Depth First Search" technique for traversing an oriented graph. This technique is illustrated graphically in FIG. 11 which shows a plurality of vertices A, B, C, D, E, F, G, H, I, J, K, L, and M which represent persistent data objects and a plurality of arrows indicating dependencies between the data objects. Vertices/objects which are pointed to by arrows are dependent on vertices/objects from which the arrows originate. For example, vertices B C and D are all dependent on vertex A; vertices E, F, and G are dependent on vertex B; vertices H, I, and J are dependent on vertex C; and vertices K, L, and M are dependent on vertex D.

Figure 11:
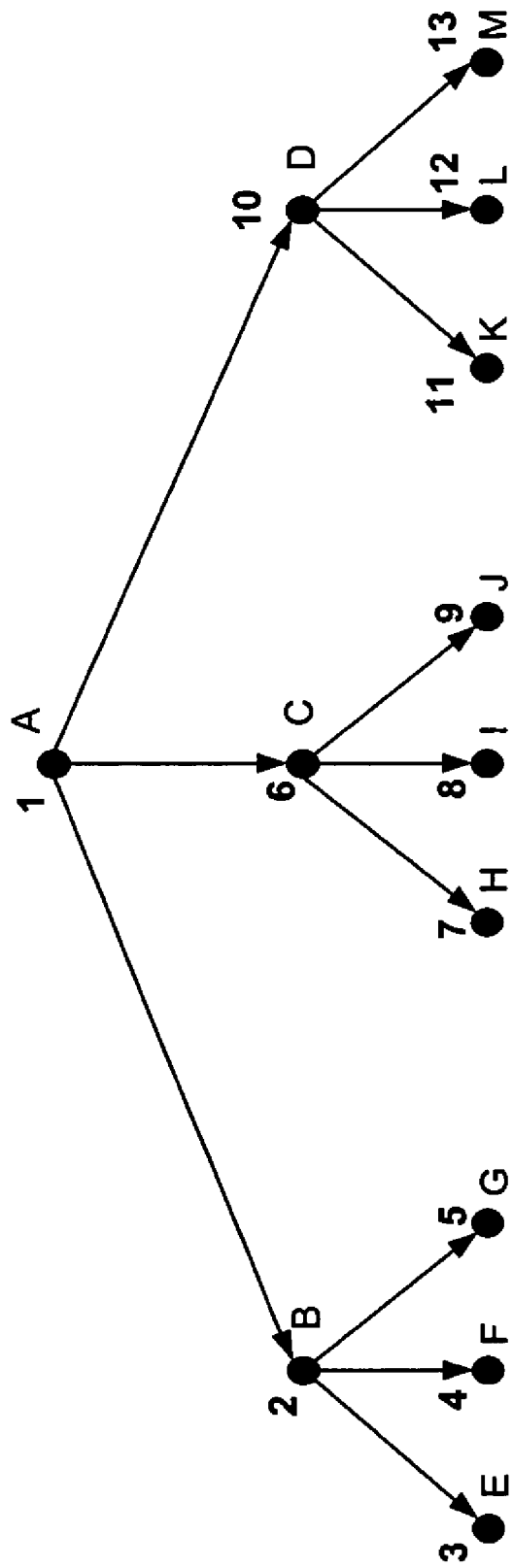
FIG. 11 illustrates a depth first search graph employed in one embodiment of the invention.

Given the relationships between persistent data objects illustrated in FIG. 11, the transaction reordering logic 900 orders the database flush sequence for the transaction as indicated by numbers 1-13. First, it progresses down the left side of the graph from A→B→E. Once it reaches vertex E at the "bottom" of the tree (thus the name "depth first" search), it moves back to vertex B and selects any additional vertices that depend on B (i.e., vertices F and G). It then moves back up to the root vertex A and back down, in turn, to C followed by H, I J, and D followed by K, L and M.

Employing a depth first search technique as just described ensures that, when the data is flushed to the database at commit time and an insert or delete statement has to be executed for a particular object, transaction reordering logic 900 first flushes all persistent data objects on which the current one depends. Thus, despite enumerating the items in the lists the transaction reordering logic 900 sometimes "jumps" ahead to the entity objects on which the current one depends. This, in fact, is an implicit execution of the Depth First Search algorithm for traversing the list of persistent data objects that are flushed. As a result, flushing persistent data objects in the new sorted order is executed without conflicts in the database.

Embodiments of the invention may include various steps as set forth above. The steps may be embodied in machine-executable instructions which cause a general-purpose or special-purpose machine, such as a computer processor or virtual machine, to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards.

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments of the invention described above focus on the Java environment, the underlying principles of the invention may be employed in virtually any environment in which relational database data is mapped to an object-oriented representation of the relational database data. These environments include, but are not limited to J2EE, the Microsoft .NET framework, and the Advanced Business Application Programming ("ABAP") standard developed by SAP AG.

Moreover, although the embodiments of the invention described above employ specific state transitions, as defined by the state transition table of FIG. 5, the specific transitions illustrated in FIG. 5 are not required for complying with the underlying principles of the invention.

Accordingly, the scope and spirit of the invention should be judged in terms of the claims which follow.

What is claimed is:

1. A cluster server system comprising:
a plurality of instances, each instance including:
a dispatcher to distribute a plurality of service requests to one or more server nodes, wherein each server node includes:
a lock manager to manage locks on one or more of a plurality of database data as requested by a locking service on a central services instance;
a cluster manager to communicate with a messaging service on the central services instance;
a configuration manager to communicate with a relational database on a permanent storage medium, the relational database to store the plurality of database data within a plurality of database tables; and
a persistence manager to map a plurality of persistent data objects to the plurality of database data and modify the persistent data objects responsive to receiving one of the plurality of service requests, the persistence manager further to associate a state property with each of the persistent data objects indicating an operation to be performed within the plurality of database tables of the relational database when the modifications to the persistent data objects are committed to the relational database,
wherein the persistence manager comprises state transition logic defining a plurality of values for the state property associated with each of the plurality of persistent data objects, wherein each of the plurality of values corresponds to a modification performed on the persistent data object with which the state property is associated.

2. The system of claim 1 wherein the plurality of values for the state property include a "default" value identifying persistent data objects which represent unmodified data from the database.

3. The system of claim 1 wherein the plurality of values for the state property comprise:
 a "created" value representing a create operation for creating new data;
 a "removed" value representing a remove operation for removing data; and
 an "updated" value representing an update operation for updating existing data.

4. The system of claim 3 wherein, in response to performing a "remove" operation on a persistent data object having a state property with the "created" value, the value of the state property transitions to "virtually removed", indicating that no operation is required when data is committed to the relational database.

5. The system of claim 1 wherein the relational database comprises a plurality of database tables and wherein each persistent data object represents data from a row of a particular database table.

6. The system of claim 5 wherein each persistent data object has a primary key associated therewith, the primary key uniquely identifying each persistent data object and each associated row of the database table.

7. The system of claim 1 wherein each persistent data object is associated with one of a plurality of business processing objects, each business processing object having business logic to perform in response to receiving one of the plurality of service requests.

8. A method comprising:
 storing a set of database data within a plurality of database tables;
 generating a plurality of persistent data objects representing the set of database data in a volatile memory;
 mapping the plurality of persistent data objects to the set of database data;
 modifying the plurality of persistent data objects responsive to receiving service requests from a dispatcher module; and
 modifying a value of a state property associated with each of the plurality of persistent data objects in response to modifying the plurality of persistent data objects, wherein the value of the state property represents an operation to be performed within the plurality of database tables of a relational database when the modifications to the persistent data objects are committed to the relational database.

9. The method as in claim 8 wherein the value for the state property includes a "default" value identifying persistent data objects which represent unmodified data from the database.

10. The method as in claim 8 wherein the value of the state property is one of:
 a "created" value representing a create operation for creating new data;
 a "removed" value representing a remove operation for removing data; and
 an "updated" value representing an update operation for updating existing data.

11. The method as in claim 10 wherein, in response to performing a "remove" operation on a persistent data object with a state property having a "created" value, the value of the state property transitions to a "virtually removed" value, indicating that no operation is required when data is committed to the relational database.

12. The method as in claim 8 wherein the relational database comprises the plurality of database tables and wherein each persistent data object represents data from a row of a particular database table.

13. The method as in claim 12 wherein each persistent data object has a primary key associated therewith, the primary key uniquely identifying each persistent data object and each associated row of the database table.

14. A machine readable medium having instructions therein that when executed by the machine cause the machine to:
 distribute a plurality of service requests from a dispatcher to one or more server nodes, wherein each server node includes:
  a lock manager to manage locks on one or more of a plurality of database data as requested by a locking service on a central services instance;
  a cluster manager to communicate with a messaging service on the central services instance;
  a configuration manager to communicate with a relational database on a permanent storage medium, the relational database to store the plurality of database data within a plurality of database tables; and
  a persistence manager to map a plurality of persistent data objects to the plurality of database data and modify the persistent data objects responsive to receiving one of the plurality of service requests, the persistence manager further to associate a state property with each of the persistent data objects indicating an operation to be performed within the plurality of database tables of the relational database when the modifications to the persistent data objects are committed to the relational database,
  wherein the persistence manager comprises state transition logic defining a plurality of values for the state property associated with each of the plurality of persistent data objects, wherein each of the plurality of values corresponds to a modification performed on the persistent data object with which the state property is associated.

15. The machine readable medium of claim 14 wherein the value of the state property includes a "default" value identifying persistent data objects which represent unmodified data from the database.

16. The machine readable medium of claim 14 wherein the plurality of values for the state property comprise:
 a "created" value representing a create operation for creating new data;
 a "removed" value representing a remove operation for removing data; and
 an "updated" value representing an update operation for updating existing data.

17. The machine readable medium of claim 16 wherein in response to performing a "remove" operation on a persistent data object having a state property with the "created" value, the value of the state property transitions to "virtually removed", indicating that no operation is required when data is committed to the relational database.

18. The machine readable medium of claim 14 wherein the relational database comprises a plurality of database tables and wherein each persistent data object represents data from a row of a particular database table.

19. The machine readable medium of claim 18 wherein each persistent data object has a primary key associated therewith, the primary key uniquely identifying each persistent data object and each associated row of the database table.

* * * * *

UNITED STATES PATENT AND TRADEMARK OFFICE
CERTIFICATE OF CORRECTION

| | | |
|---|---|---|
| PATENT NO. | : 7,653,651 B1 | Page 1 of 1 |
| APPLICATION NO. | : 10/836159 | |
| DATED | : January 26, 2010 | |
| INVENTOR(S) | : Vladimir K. Pavlov | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 717 days.

Signed and Sealed this

Twenty-third Day of November, 2010

David J. Kappos
*Director of the United States Patent and Trademark Office*